United States Patent Office 3,019,190
Patented Jan. 30, 1962

3,019,190
FIRE-RESISTANT HYDRAULIC FLUIDS
Rudolph J. Holzinger, North Merrick, N.Y., assignor to Socony Mobil Oil Company, Inc., a corporation of New York
No Drawing. Filed Jan. 19, 1959, Ser. No. 787,349
10 Claims. (Cl. 252—75)

This invention relates to an improved composition and method of its preparation and is particularly concerned with improved water-in-oil emulsions useful as fire-resistant hydraulic oils and metalworking oils and their method of preparation.

Hydraulic systems are being employed more and more extensively in industry to operate machinery from remote locations and with comparative ease. Various types of liquids have been employed as the operative fluid in these hydraulic systems; however, for one reason or another, these liquids have been found to lack required properties. Various oils, such as mineral oils, have found much favor in the past; however, many applications of hydraulic systems cannot tolerate leaks with such a pressure transmitting medium since the oil, under high pressure, may then find its way to heat and flame where explosion or combustion occurs. Hydraulic systems are used in metalworking and treating plants and leaks in the system have caused serious accidents in the past.

Water-in-oil emulsions have been tried in the prior art to provide a useful hydraulic oil that had the benefit of low flammability. As long as these emulsions remain unbroken with the water uniformly dispersed throughout the oil in the form of fine particles, the fire resistance remains high. However, adequate stability in this respect of the emulsion has not been present in prior formulations. The water particles tend to agglomerate in clusters and to settle to the lower part of the reservoir, thereby impairing the fire resistance of the fluid remaining in the upper part. In some cases, an upper layer of clear oil possessing no fire resistance whatsoever will result. In more severe cases, the water may coalesce into larger droplets which eventually will settle out and form a layer of free water on the bottom. In addition to impairment of fire resistance, the latter condition is objectionable in that free water may enter the circulating system and may cause corrosion of lines and working parts and rapid wear of pump parts due to lack of lubrication. It is essential, therefore, that the water particles be dispersed in the oil so that good lubricity is obtained. It is further essential that the water particles be small and uniformly distributed throughout the oil to keep corrosion tendency to a minimum and provide the minimal amount of metal wear.

An object of this invention is to provide an improved composition for use as an hydraulic oil.

An additional object of this invention is to provide an improved composition having fire-resisting properties for use as an hydraulic oil.

An additional object of this invention is to provide an improved stable water-in-oil emulsion having fire-resisting properties for use as an hydraulic oil.

These and other important objects will be made apparent in the ensuing detailed discussion of this invention.

I have found that a stable, fire-resistant water-in-oil emulsion can be obtained by emulsifying up to 50 percent water with an oil, using a calcium sulfonate as the basic emulsifier and, further, using selected calcium soaps of aliphatic acids having carbon chains at least greater than $C_{18}$ as a stabilizing medium.

The oil used may be any suitable hydrocarbon oil of viscosity range from about 50–400 Saybolt Universal seconds at 100° F. It has been found, however, that a white oil in that viscosity range provides unusually good results when using the emulsifying and stabilizing agents disclosed hereinafter. This is a completely unexpected result since the rigorous refining required to produce white oils is generally conceded to remove natural inhibitors (see Kalichevsky and Kobe, "Petroleum Refining With Chemicals," Elsevier Publishing Company, 1956), reduce lubricity and greatly interfere with emulsion stability. However, when a white oil is used as the base oil of the emulsion of this invention, improved oxidation resistance and improved emulsion stability are obtained while retaining good lubricity. This can be readily demonstrated by running oxidation tests, such as by ASTM Standard Method of Test for Oxidation Characteristics of Inhibited Steam-Turbine Oils, ASTM Designation D–943–54, on the emulsion using a naphthenic base or a paraffin base oil and a white oil as the base oil. In this test, the sample is subjected to a temperature of 95° C. in the presence of water, oxygen and an iron-copper catalyst. The naphthenic oil clearly shows signs of poor oxidation stability while the paraffin oil clearly shows signs of poor emulsion stability. On the contrary, the emulsion made using white oil as the base oil shows good oxidation and good emulsion stability. This is clearly a result that could not be predicted from prior knowledge.

The preferred materials for making oil soluble sulfonates are those obtained by sulfonation of mineral lubricating oil fractions which may be prepared by any of the well known and accepted methods in this art. The calcium sulfonate used as the basic emulsifier may be present in the blend in the amount of 0.1–5.0 percent by weight of the total blend but preferably about 0.25–2.00 percent by weight can be used to provide entirely satisfactory results. The calcium sulfonate, while primarily an emulsifying agent, supplies a certain amount of anti-corrosive action and anti-wear protection. The calcium sulfonate should have a molecular weight of at least about 900. When the calcium sulfonate has a molecular weight of about 1000 the emulsification is excellent.

It is found that the emulsion will gradually deteriorate when calcium sulfonate is used alone and hence the mixture of calcium sulfonate and oil alone as the oil phase of the hydraulic fluid is not satisfactory. However, unusually stable emulsions are found to occur when the calcium soaps of aliphatic acids (both saturated and unsaturated) are used as a stabilizing medium. While calcium soaps of fatty acids such as oleic, stearic or palmitic acid have previously been suggested as emulsifiers or stabilizers for water-in-oil systems, we have now discovered the length of the acid chain to be critical, acids having a chain length of $C_{18}$ or less being found to possess little or no stabilizing action. Particularly useful are fatty acids (saturated or unsaturated) of a chain length about $C_{19}$–$C_{29}$. Outstanding results are obtained with behenic acid ($C_{22}$). Outstanding results can also be obtained with erucic acid (unsaturated $C_{22}$ acid). The concentration of the stabilizing agent in the finished blend may vary from about 0.1–5.0 percent by weight but preferably should be from about .25–2.0 percent by weight.

In order to insure adequate fire protection, a sufficient amount of water must be properly emulsified into the oil. The water may range from about 10–50 percent of the water-in-oil emulsion; however, a fully acceptable emulsion having excellent fire-resisting properties is obtained when the water is about 25–45 percent of the water-in-oil emulsion.

In preparing the emulsions of this invention it has been found advantageous to form the calcium soap in situ. Thus, a preferred method of preparation calls for dissolving or dispersing the lime in the water and mixing the solution or dispersion rapidly with the oil containing the calcium sulfonate and aliphatic acid with high-speed agitation. Generally, the water phase is added to the oil phase, although in some cases the opposite method may be preferred. The resultant emulsion may be subjected to further mechanical treatment such as passing it through a colloid mill or homogenizer. A suitable method of preparation is as follows: The calcium sulfonate and the aliphatic acid are dissolved in the oil and the mixture is heated to 175±5° F. The water is heated to 175±5° F. and the lime, after being added to the water, is kept in dispersion by mild agitation. The water phase is then added to the oil phase under vigorous agitation, using a high-speed mixer, followed, if necessary, by further mechanical treatment such as passing the emulsion through a colloid mill or homogenizer. In some cases, it may be desirable to also form the calcium sulfonate in situ. In this instance, both the sulfonic acid and the aliphatic acid are dissolved in the oil, with the subsequent steps remaining substantially unchanged.

It is desirable and in many cases essential that the amount of lime to be used in preparing these emulsions be sufficient to form the basic soaps of the aliphatic acids and also, if a neutral calcium sulfonate is used, to convert the latter to the basic sulfonate. Frequently, it is desirable to employ an amount of lime in excess of the stoichiometric ratio necessary to produce both the basic soaps and the basic sulfonate. This excess may, for instance, amount to 50 percent above the stoichiometric ratio and may be as much as 100 percent or more.

Rating of the emulsions formed may be done visually either at room temperature or after storage at elevated temperature, e.g., 170° F. A convenient method consists of storing the emulsions in 100 ml. graduated cylinders so that the volume of oil or water separated may be read directly as percent of total volume. Obviously, it is desirable to keep separation of oil and water to a minimum.

In some cases, it is desirable to compare the quality of emulsions without resorting to storage tests. In such cases, a measure of particle size may be had by electrical measurements, e.g., noting the voltage required to obtain current flow between submerged electrodes spaced ⅛″ apart. In very coarse emulsions of the water-in-oil type, the voltage approaches zero. Where the water is very finely dispersed, the voltage required may exceed 500. Consequently, the higher the voltage reading obtained, the better the emulsion and vice versa.

The following examples will demonstrate the magnitude of improvement brought about by this invention. In Table I shown below, advantages are shown obtained by the use of the novel type emulsifier when used in conjunction with prior art oils.

*Table I*

| Examples | Unsaturated Acids | | | | Saturated Acids | | | | | |
|---|---|---|---|---|---|---|---|---|---|---|
| | 1 | 2 | 3 | 4 | 5 | 6 | 7 | 8 | 9 | 10 |
| Oleic Acid ($C_{18}$) | 0.9 | | 0.9 | | | | | | | |
| Erucic Acid ($C_{22}$) | | 0.9 | | 0.9 | | | | | | |
| Stearic Acid ($C_{18}$) | | | | | 0.9 | | 0.9 | | | |
| Behenic Acid ($C_{22}$) | | | | | | 0.9 | | 0.9 | 0.9 | |
| Montanic Acid [1] ($C_{28}$) | | | | | | | | | | 0.9 |
| 900 M. Wt. Calcium Sulfonate | | | 0.6 | 0.6 | | | | 0.6 | 0.6 | 0.6 |
| 100″ Solvent Refined Paraffin | 60 | 60 | 60 | 60 | 60 | 60 | 60 | 60 | 60 | 60 |
| Lime | .16 | .15 | .16 | .15 | .16 | .15 | .125 | .16 | .15 | .125 |
| Water | 40.0 | 40.0 | 40.0 | 40.0 | 40.0 | 40.0 | 40.0 | 40.0 | 40.0 | 40.0 |
| Appearance | Almost Immed. Separ. | OK | OK | OK | Immed. Separ. | Immed. Separ. | OK | OK | OK | OK |
| Breakdown Voltage | 0 | 350 | | | 0 | 0 | 440 | | | |
| Phase Separation, 24 Hrs. at 170° F.: | | | | | | | | | | |
| Oil, Percent | Complete Separ. | Complete Separ. | Complete Separ. | 1 | | | | | | |
| Water, Percent | | | | <1 | | | | | | |
| 168 Hrs. at 170° F.: | | | | | | | | | | |
| Oil, Percent | | | | | | | 17 | 44 | 20 | 5 |
| Water, Percent | | | | | | | 0 | <1 | 0 | 1 |

[1] Gersthofen wax L.

In comparing Examples 1 and 2, the superiority of Example 2 will be noted. Whereas oleic acid used in Example 1 produced an emulsion that broke almost immediately and showed no resistance to electrical breakdown, Example 2 presented a satisfactory appearance and considerable resistance to electrical breakdown. However, neither example was stable at elevated temperature. When oleic acid was combined with calcium sulfonate, a moderate improvement was obtained in that the emulsion was satisfactory when prepared; however, stability at elevated temperature remained unsatisfactory. In contrast, the combination of erucic acid with calcium sulfonate (Example 4) resulted in a composition exhibiting virtually no separation at 170° F., indicating a definite synergistic effect.

Similar observations were made with emulsions prepared with basic soaps of saturated acids (Examples 5 through 10). In these tests, storage at 170° F. was extended to 168 hours (7 days), thus drastically increasing the severity of the test. Again it will be noted that acids with a chain length greater than $C_{18}$ provide greatly improved stability. This is particularly true in combination with sulfonate (Examples 8, 9 and 10). For instance, behenic acid (Example 9) produces less than one-half the amount of oil separation produced by stearic acid (Example 8). A further increase in chain length (Example 10) results in a further drastic reduction in oil separation, i.e., to about one-ninth the amount obtained with prior art calcium soaps (Example 8). The magnitude of this effect is surprising and could not be predicted on the basis of prior knowledge.

The ratio between calcium sulfonate and calcium soap may vary from 5/95 to 95/5, depending upon the type and viscosity of the oil and the type and molecular weight of sulfonate used. The ratios usually employed, however, fall within the range 90/10 and 50/50.

As set forth above, the degree of refining of a petroleum oil is usually associated with ease of emulsification, more refined oils ordinarily being more resistant to emulsification. It is totally unexpected, therefore, that white oils lend themselves very well to this application and, as a matter of fact, have been found to be of outstanding utility. Representative examples are shown in Table II.

Table II

| Examples | Parts by Weight | | | |
|---|---|---|---|---|
| | 11 | 12 | 13 | 14 |
| Water | 40 | 40 | 40 | 40 |
| Calcium Sulfonate (40% Active) | 3 | 3 | 3 | 3 |
| 100″ Naphthenic Oil, Conventionally Refined | 57 | | | |
| 100″ Naphthenic Oil, Solvent Refined | | 57 | | |
| 100″ Paraffin, Solvent Refined | | | 57 | |
| 90″ U.S.P. White Oil | | | | 57 |
| Storage Stability, 5 Days at 170° F.: Separation— | | | | |
| Oil, percent | 20 | Almost Complete Separation. | Complete Separation 2 Days. | 17 |
| Water, percent | 23 | | | 14 |

Example 11 is based on a conventionally refined naphthenic oil, i.e., a naphthenic oil which has received a light acid treat using approximately 10 pounds of 95 percent sulfuric acid per barrel. The resultant emulsion shows separation of oil and water amounting to 20 and 23 percent, respectively, after 5 days at 170° F. An emulsion prepared from a much more drastically refined naphthenic oil obtained by solvent treating as used in Example 12 shows almost complete separation after the same period. An emulsion prepared from a paraffin oil having received similar treatment to that which was employed in Example 13, had separated completely after only 2 days. In contrast, an emulsion prepared from the white oil used in Example 14 representing the most drastic refining treatment still was largely intact after 5 days' storage at the elevated temperature. In fact, it was superior to Example 11, showing reduced oil separation. Even more important was the improvement in water separation, which had been shown above to be the more important stability problem. In this instance, separation was reduced by almost 40 percent as compared to Example 11.

In many industrial applications, including hydraulic oils, resistance to high temperatures is frequently required. In this respect, prior art preparations are particularly deficient. Representative examples of prior art oils have been shown in Table II, Examples 11, 12 and 13. They are characterized by fairly rapid breakdown when exposed to a temperature of 170° F. In contrast, emulsions embodying the features of the present invention have been found to exhibit good stability even at temperatures approaching the boiling point of water.

In Table I were shown advantages obtained by using the novel emulsifiers and the preferred process entailing formation of calcium soap in situ. Table II showed the improvement brought about by using white oil in place of conventional lubricating oils. In Table III, presented hereinafter, are given further examples showing the combined beneficial effects from the use of a representative novel emulsifier, the novel oil and the preferred method of preparation.

Table III

| Examples | Parts by Weight | | | | |
|---|---|---|---|---|---|
| | 15 | 16 | 17 | 18 | 19 |
| Antioxidant | 0.5 | 0.5 | 0.5 | 0.5 | 0.5 |
| Neut. Calcium Sulfonate, 1,000 M. Wt., 100% Active | 1.0 | 0.9 | 0.8 | 0.7 | 0.6 |
| Behenic Acid | | 0.1 | 0.2 | 0.3 | 0.4 |
| 140″ U.S.P. White Oil | 18.5 | | | | |
| 90″ U.S.P. White Oil | 40.0 | Same | Same | Same | Same |
| Lime | 0.2 | | | | |
| Water | 40.0 | | | | |
| Storage Stability, 4 Days at 200° F.: Separation— | | | | | |
| Oil, Percent | 32 | 20 | 13 | 12 | 13 |
| Water, Percent | 8 | 11 | 7 | 7 | 10 |

It will be noted that Example 15, which does not contain any stabilizing soap, is superior in stability to prior art emulsions in that separation of water is greatly reduced in spite of exposure to a higher temperature. The introduction of behenic acid in the form of basic calcium behenate formed in situ (Examples 16, 17, 18 and 19) brings about a further drastic improvement in stability. This is particularly in evidence in Examples 17 and 18 wherein the soap derived from behenic acid represents about 20 and 30 percent, respectively, of the total emulsifier content. While water separation is reduced slightly, the reduction of oil separation amounts to 60 percent.

The detailed description of the invention given hereinabove and the examples supplied are not intended to limit the scope of this invention. The only limitations intended are those found in the claims attached hereto.

I claim:

1. A composition for use as hydraulic fluid consisting essentially of a water-in-oil emulsion containing about 0.1–5.0 percent by weight of oil soluble calcium petroleum sulfonate as an emulsifying agent and about 0.1–5.0 percent by weight of calcium soaps of aliphatic mono acids having carbon chains of about $C_{19}$–$C_{29}$ as a stabilizing medium, the oil component of said emulsion being a hydrocarbon oil of viscosity range of about 50–400 Saybolt Universal seconds at 100° F., the water component of said emulsion being within the range of about 10–50 percent by weight and the ratio of sulfonate to soap being limited between 5/95 to 95/5.

2. A composition for use as hydraulic fluid consisting essentially of a water-in-oil emulsion in which about 10–50 percent by weight of the mixture is water uniformly distributed in fine-particle form and containing about 0.1–5.0 percent by weight of oil soluble calcium petroleum sulfonate as an emulsifying agent and about 0.1–5.0 percent by weight of calcium soaps of aliphatic mono acids having carbon chains of about $C_{19}$–$C_{29}$ as a stabilizing medium, the oil component of said emulsion being a hydrocarbon oil of viscosity range of about 50–400 Saybolt Universal seconds at 100° F., the ratio of sulfonate to soap being limited between 5/95 to 95/5, whereby the emulsion is retained with the water particles in fine-particle form and uniformly distributed throughout the mixture.

3. A composition for use as hydraulic fluid consisting essentially of a water-in-oil emulsion in which about 25–45 percent by weight of the mixture is water uniformly distributed in fine-particle form and containing about 0.25–2.00 percent by weight of oil soluble calcium petroleum sulfonate as an emulsifying agent and about 0.25–2.00 percent by weight of calcium soaps of aliphatic mono acids having carbon chains of about $C_{19}$–$C_{29}$ as a stabilizing medium, the oil component of said emulsion being a hydrocarbon oil of viscosity range of about 50–400 Saybolt Universal seconds at 100° F., the ratio of sulfonate to soap being limited between 5/95 to 95/5, whereby the emulsion is retained with the water particles in fine dispersion in the oil.

4. A composition for use as hydraulic fluid consisting essentially of a water-in-oil emulsion in which about 25–45 percent by weight of the mixture is water uniformly distributed in fine-particle form, the oil is a white oil having a viscosity of about 50 to 400 Saybolt Universal seconds at 100° F. and the mixture contains about 0.25–2.00 percent by weight of oil soluble calcium petroleum sulfonate as an emulsifying agent and about 0.25–2.00 percent by weight of calcium soaps of fatty mono acids having carbon chains of about $C_{19}$–$C_{29}$ as a stabilizing medium, the ratio of sulfonate to soap being limited between 5/95 to 95/5, whereby the emulsion is retained with the water particles in fine dispersion in the oil.

5. A composition for use as hydraulic fluid consisting essentially of a water-in-oil emulsion in which about 25–45 percent by weight of the mixture is water uniformly distributed in fine-particle form, the oil is a white oil having a viscosity of about 50–400 Saybolt Universal seconds at 100° F. and the mixture contains about 0.25–2.00 percent by weight of oil soluble calcium petroleum sulfonate as an emulsifying agent and about 0.25–2.00 percent by weight of the calcium soap of behenic acid as a stabilizing medium, the ratio of sulfonate to soap being limited between 5/95 to 95/5, whereby the emulsion is retained with the water particles in fine dispersion in the oil.

6. A composition for use as hydraulic fluid consisting essentially of a water-in-oil emulsion in which about 25–45 percent by weight of the mixture is water uniformly distributed in fine-particle form, the oil is a white oil having a viscosity of about 50–400 Saybolt Universal seconds at 100° F. and the mixture contains about 0.25–2.00 percent by weight of oil soluble calcium petroleum sulfonate as an emulsifying agent and about 0.25–2.00 percent by weight of the calcium soap of erucic acid as a stabilizing medium, the ratio of sulfonate to soap being limited between 5/95 to 95/5, whereby the emulsion is retained with the water particles in fine dispersion in the oil.

7. A composition for use as hydraulic fluid consisting essentially of a water-in-oil emulsion containing about 0.1–5.0 percent by weight of oil soluble calcium petroleum sulfonate, about 0.1–5.0 percent by weight of aliphatic mono acids having carbon chains of about $C_{19}$–$C_{29}$ and an amount of free lime substantially in excess of that required to produce the basic oil soluble calcium petroleum sulfonate and the basic calcium soaps of the aliphatic mono acids, the oil component of said emulsion being a hydrocarbon oil of viscosity range of about 50–400 Saybolt Universal seconds at 100° F., the water component of said emulsion being within the range of about 10–50 percent by weight and the ratio of sulfonate to soap being limited between 5/95 to 95/5.

8. The composition of claim 7 further characterized in that the excess of free lime is limited to about 100 percent greater than that required to produce the basic oil soluble calcium petroleum sulfonate and the basic calcium soaps of the aliphatic mono acids.

9. The composition of claim 7 further characterized in that the excess of free lime is limited to about 50 percent greater than that required to produce the basic oil soluble calcium petroleum sulfonate and the basic calcium soaps of the aliphatic mono acids.

10. The method of preparation of a water-in-oil emulsion which comprises the steps: dissolving aliphatic mono acids having carbon chains of about $C_{19}$–$C_{29}$ and oil soluble calcium petroleum sulfonate in the base oil, said oil being a hydrocarbon oil of viscosity range of about 50–400 Saybolt Universal seconds at 100° F., dispersing lime in the water, the amount of lime being limited between the stoichiometric ratio necessary to produce both the basic soap and the basic sulfonate and about 100 percent in excess of that amount, combining the oil phase with the aqueous phase in such a manner as to simultaneously effect both formation of basic calcium salts and emulsification, the water component of said emulsion being within the range of about 10–50 percent by weight, the final product containing about 0.1–5.0 percent by weight of oil soluble calcium petroleum sulfonate, about 0.1–5.0 percent by weight of calcium soaps of aliphatic mono acids and the ratio of sulfonate to soap being limited between 5/95 to 95/5.

References Cited in the file of this patent

UNITED STATES PATENTS

| | | |
|---|---|---|
| 2,671,758 | Vinograd | Mar. 9, 1954 |
| 2,744,870 | Stillebroer | May 8, 1956 |
| 2,820,007 | Van Der Minne | Jan. 14, 1958 |
| 2,834,731 | Carpenter | May 13, 1958 |
| 2,894,910 | Francis | July 14, 1959 |
| 2,944,022 | Ulzheimer et al. | July 5, 1960 |